(12) United States Patent
Rahn et al.

(10) Patent No.: US 7,685,932 B2
(45) Date of Patent: Mar. 30, 2010

(54) SYSTEM, METHOD AND APPARATUS FOR HEATING WATER

(75) Inventors: Christopher W. Rahn, Virden, IL (US); Randy D. Pope, Edinburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 811 days.

(21) Appl. No.: 10/983,446

(22) Filed: Nov. 8, 2004

(65) Prior Publication Data

US 2005/0103202 A1      May 19, 2005

Related U.S. Application Data

(60) Provisional application No. 60/518,411, filed on Nov. 7, 2003.

(51) Int. Cl.
*A47J 31/24* (2006.01)
(52) U.S. Cl. .......................... 99/315; 99/295; 99/302 R; 99/307; 426/433
(58) Field of Classification Search .................. 99/315, 99/314, 307, 295, 302 R; 426/433, 434
See application file for complete search history.

(56) References Cited

U.S. PATENT DOCUMENTS

| | | | | |
|---|---|---|---|---|
| 3,007,392 A | * | 11/1961 | Pecoraro et al. | ................ 99/307 |
| 3,561,349 A | * | 2/1971 | Endo et al. | .................... 99/307 |
| 3,620,155 A | | 11/1971 | Bixby, Jr. | |
| 4,253,385 A | * | 3/1981 | Illy | ............................. 99/281 |
| 4,254,694 A | * | 3/1981 | Illy | ............................. 99/295 |
| 4,421,014 A | * | 12/1983 | Vicker | ...................... 99/289 P |
| 4,429,623 A | | 2/1984 | Illy | |
| 5,008,013 A | | 4/1991 | Favre et al. | |
| 5,083,504 A | | 1/1992 | Koga et al. | |
| 5,111,704 A | | 5/1992 | Hill | |
| 5,347,916 A | | 9/1994 | Fond et al. | |
| 5,477,775 A | | 12/1995 | Delhom et al. | |
| 5,638,741 A | | 6/1997 | Cisaria | |
| 5,910,205 A | * | 6/1999 | Patel | ........................... 99/315 |
| 6,244,162 B1 | | 6/2001 | Dahmen | |
| 6,658,989 B2 | | 12/2003 | Sweeney et al. | |
| 6,779,437 B2 | * | 8/2004 | Sachtleben | ................... 99/305 |
| 6,832,542 B2 | * | 12/2004 | Hu et al. | ................... 99/302 R |
| 7,032,503 B2 | * | 4/2006 | Cai | ............................. 99/286 |

FOREIGN PATENT DOCUMENTS

WO    WO 03/030696 A1    4/2003

* cited by examiner

*Primary Examiner*—Reginald L Alexander
(74) *Attorney, Agent, or Firm*—Barnes & Thornburg LLP

(57) ABSTRACT

A system, method and apparatus for increasing the interaction between water and a brewing substance in a brewing apparatus. The structure includes a spray head having a thickness dimension which facilitates the formation and definition of tubes or passages extending therethrough. The passages are directed at an angle so as to provide an extended flow path to and through the brewing substance. The spray head is positioned a dimension above the brewing substance retained in a pod so as to increase the interaction between water dispensed through the spray head and the brewing substance which is infused by the water from the spray head. The use of the angled paths helps to increase the saturation, penetration and agitation of the brewing substance so as to help promote uniformity of extraction of the brewing substance. Additionally, directed flow helps facilitate quicker rate of expansion of the brewing substance within the corresponding chamber thereby helping to improve the overall brewing process.

15 Claims, 2 Drawing Sheets

SYSTEM, METHOD AND APPARATUS FOR HEATING WATER

CROSS REFERENCE

This application claims the benefit of U.S. provisional application Ser. No. 60/518,411, filed Nov. 7, 2003.

BACKGROUND

A variety of brewing apparatus have been developed to combine heated water with a brewing substance such as ground coffee or tea material in order to infuse the material and produce a brewed beverage. There are many ways to combine the water with the brewing substance. One way is to place the substance in a filter device such as a disposable filter paper and place the filter paper and brewing substance in a brewing funnel or basket. The water is mixed with the brewing substance in the filter thereby allowing the brewed substance to filter through the paper leaving the saturated brewing substance in the filter paper. The saturated substance and used filter paper can be thrown away.

Another way of brewing beverage is to encapsulate the brewing substance in a filter material. The brewing substance in the filter material provides a convenient package for handling a predetermined quantity of brewing substance. The filter material provides a package or container for the brewing substance. This package allows the brewing substance to be handled prior to brewing and after brewing without complication or mess.

Such brewing substances pre-packaged in filter material are referred to as "pods" or "sachets." Pods can be compressed while packaging in the filter material or left in a generally loose condition. Pods are generally shaped in a circular shape having a generally flattened configuration. The pods often are provided in the shape of a disc or puck. Pods generally range in a size from approximately 45-60 mm and contain approximately 9-10 grams of brewing substance. The typical pod is used to produce approximately 8 ounces of brewed beverage.

It is desirable to improve the flavor and extraction of the flavors and other components of the coffee or other brewing substances. When brewing a beverage it is desirable to saturate, penetrate, agitate and otherwise engage all of the particles of the brewing substance so as to thoroughly wash from the brewing substance all of the desirable flavor characteristics and substances for incorporation into the brewed beverage.

One method of determining the flavor of coffee or any other brewed beverage is by taste. One way of more objectively determining the characteristics is by use of an extraction test. The extraction test requires brewed beverage to be placed in a refractometer which calculates the percentage of solubles. The refractometer produces a number which can then be compared to an established scale calibrated to various characteristics. Another technique for objectively determining the characteristics of a beverage is to perform a uniformity of extraction test. In theory, a properly brewed beverage will uniformly extract solubles, particles and other flavor characteristics from all of the particles of the brewing substance in a generally uniform manner. In practice, extraction generally does not occur in a uniform manner across all regions of the pod. In other words, some areas of the brewing substance will be extracted to a desired level, some may be extracted below a desired level and some areas may be over extracted. This variety of extraction levels in different areas of the brewing substance may occur with brewing devices and methods which employ a pod of brewing substance. The pod retains the brewing substance in a generally confined area. As such, the brewing material may not freely agitate within the confinement of the filter material. As a result the water may tend to pass directly from the top of the pod, collecting solubles as it passes through the pod and exiting through the bottom of the pod in a generally vertical path. This flow pattern through the pod may result in some areas being over extracted and other areas being under extracted. Generally, it is acknowledged that pod brewing may produce non-uniform extraction.

It would be desirable to improve the uniformity of extraction and extraction characteristics of a pod brewing system.

DESCRIPTION OF THE DRAWINGS

The organization and manner of the structure and function of the disclosure, together with the further objects and advantages thereof, may be understood by reference to the following description taken in connection with the accompanying drawings, and in which.

DETAILED DESCRIPTION

Figure 1:
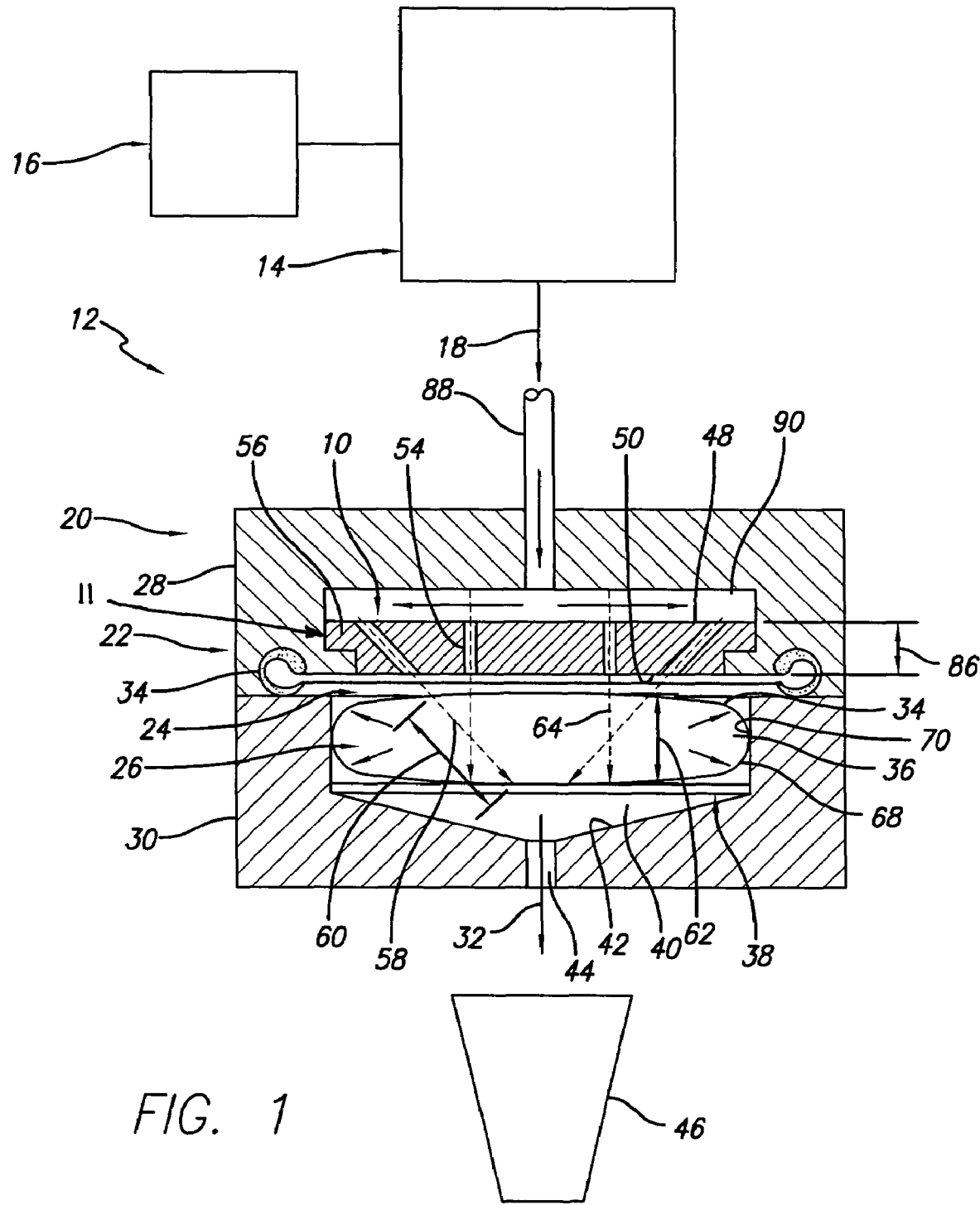
FIG. 1 shows a general diagrammatic illustration of a beverage brewing system employing a brewing substance pod which is infused by water from a water delivery assembly associated with a brewing chamber for producing brewed beverage therefrom.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Figure 2:
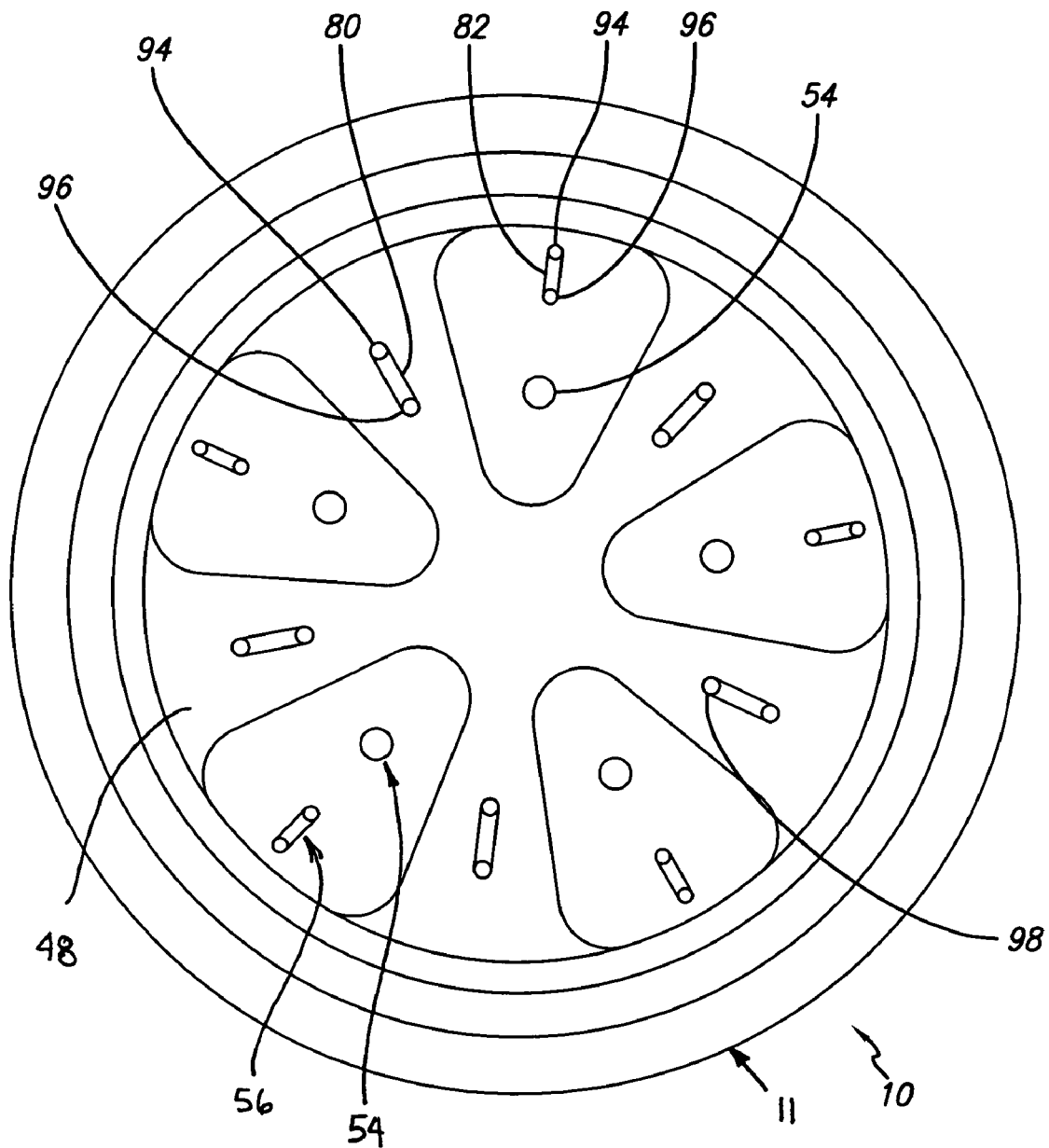
FIG. 2 is a top view of a spray head employed in the brewing system of FIG. 1.

With reference to the figures, FIG. 1 shows a general diagrammatic view of a partial cross-section of the water delivery system 12, apparatus and method of use. Further, FIG. 2 provides an enlarged top view of the pod side of a spray head 10 used in the present disclosure. The disclosed system 12 is used in the production of a brewed beverage. The system 12 includes a water delivery assembly 14 controlled by a controller 16 to controllably dispense heated water 18 to a brewing assembly 20. The brewing assembly 12 includes a housing 22 defining a brewing chamber 24. A pod 26 is retained in the brewing chamber 24 for infusion with water 18 delivered from the water delivery assembly 14.

While many variations on the structure and configuration of the brewer housing 22 can be devised, illustrated is a brewer housing 22 including an upper portion 28 and a lower portion 30. The spray head 10 is retained on the housing 22 generally in the brew chamber 24 to controllably direct water from the water delivery assembly 14 to the pod 26. While the spray head 10 is shown attached to the upper portion 28 of the housing 22, a variety of configurations of attaching, retaining, sealing and otherwise associating the spray head 10 with the housing 22 can be employed. The configuration as shown in FIG. 1 is one of many configurations which can be developed or otherwise constructed by one of skill in the art to achieve the structures, functions and benefits of the spray head 10 for use with a brewing assembly 20. Water is directed into the pod 26 so as to improve the taste of the brewed beverage 32 produced thereby. A sealing structure or gasket 34 is positioned in the housing relative to the upper portion and lower portion to provide a seal during the brewing process. A sealing structure such as a self expanding sealing structure 34 is shown. It will be recognized by one of skill in the art that a variety of sealing structures can be employed to achieve a sealing between an upper portion 28 and a lower portion 30 of the housing 22. All variations of sealing and otherwise closing the housing 22 to form the chamber 24 are envisioned as being included in the present disclosure.

Terms including brew, brewer, beverage and beverage making as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

The pod 26 is constructed of a suitable filter material 34 surrounding or otherwise enclosing a quantity of beverage brewing substance 36. The pod 26 may also be constructed in a reusable configuration such that brewing substance 36 may be selected for the type and quantity by the user. In this configuration, the pod 26 may be opened or otherwise accessed by the user to deposit the selected quantity and type of brewing substance therein. This pod can then be closed or otherwise placed in the chamber 24 for brewing in a manner similar to, if not identical to, a pod formed of a suitable filter material such as a non-woven filter fabric or other mesh material.

The beverage brewing substance will be referred to as coffee throughout this description, however, it should be understood that any type of substance which may be used in the brewing process is considered to be included in a broad description of brewing substance. This includes coffee, tea, herbs, other plant and vegetable materials, synthetically created materials, concentrated materials such as freeze dried coffee, flavor charged substances, powdered substances and any other form of substance which might be used to produce a beverage in combination with water or any other liquid.

The pod 26 is retained in the chamber 24 generally on a structure 38 such as a screen or other generally open supporting structure. Other structures may be provided in a lower portion 40 of the chamber 24 to provide a separation between the pod 26 and an interior surface 42 of the lower portion of the chamber 40 to allow beverage to drain from the pod 26 to the lower portion 40 and drain thorough an outlet bore 44 into a container 46. The brewing assembly 20, water delivery assembly 14 and controller 16 are part of a brewing apparatus, the details of which are not shown for purposes of broadly disclosing and describing the present system 12.

The spray head 10 as shown is retained in the housing 22 so that water 18 is introduced on a first side 48 of the spray head 10. Water passes through various openings in the spray head 10 and exits the spray head 10 on a second side 50. The various openings include, for example as shown, a vertical passages 54 and angled passages 56. The spray head 10 can be configured with a plurality of angled passages 56 and no vertical passages 54 or a combination of angled passages 56 and vertical passages 54. It may be desirable to provide a spray head 10 which is removable from the housing 22 for purposes of cleaning the spray head to remove particles, sediment, oils, mineral deposits or any other accumulations which may occur on the spray head surfaces, as well as, to provide periodic sanitation of the spray head. It is envisioned that a variety of attachment structures and devices may be employed to be used with the spray head 10 to retain in to the housing 22. For example, clips, retaining rings and fasteners may be used to attach the spray head 10 to the housing 22.

In the embodiment as shown in FIGS. 1 and 2, angled passages 56 are provided. The angled passages provide a spray path 58 which generally travels diagonally from the spray head 10 and through the pod 26. The angled spray path 58 traverses a distance 60 through the brewing substance 36 of the pod 26. The distance 60 of the angled spray path 58 is generally longer than the thickness dimension 62 of the pod 26. Increasing the spray path 58 length dimension 60 provides the opportunity to increase the interaction of the water flowing through this path with the brewing substance 36 thereby increasing the engagement and interaction of the water with the particles of the brewing substance 36. In contrast, vertical spray paths 64 of the vertical passages 54 generally only travel a distance generally equal to the thickness 62 of the pod 26.

One embodiment as shown in FIG. 1 includes vertical spray paths 64 as well as angled spray paths 58. As noted above, it is envisioned that a configuration may be produced in which only angled spray paths 58 are provided.

One of the benefits of providing the angled spray paths 58 dispensing water from the angled passages 56 is that the brewing substance 36 inside the filter material 34 tends to be more thoroughly penetrated and saturated and the water more thoroughly interacts with the brewing substance 36. The interaction of the water in the brewing substance causes the water to more quickly be thoroughly spread throughout the brewing substance. By directing the water inwardly towards the center sections of the pod and diagonally across the brewing substance 36 in the pod 26 the pod tends to expand more quickly and outwardly from the center as the brewing substance absorbs water and releases gasses. This quicker rate of expansion tends to help the pod seal in the brewing chamber 24. Sealing results from the exterior surfaces 68 of the filter material 34 pressing against the interior surfaces 70 of the brew chamber 24 as a result of the expanding brewing substance. One of the benefits of sealing the exterior surface 68 against the interior surface 70 is to prevent water from flowing around the pod instead of passing through the pod. It might be expected that water flowing around the pod will decrease the interaction of the water and the brewing substance 36 with the resultant brew 32 being less desirable. Alternatively, additional brewing substance 36 may be needed to compensate for the water which is bypassing the pod 26. However, if the expansion and sealing of the pod 26 in the chamber 24 occurs early in the brewing cycle the extraction of desirable solubles and characteristics from the brewing substance 36 will be enhanced.

The diameter of the passages 54, 56 can be modified to achieve various brewing characteristics. The diameter of the passages as well as the angle of the passages must be balanced with other variables. For example, the water delivery system 14 is generally configured to provide a predetermined quantity of water over a predetermined period of time at generally a predetermined pressure. The pressure may be affected by the temperature of the water as well as other parameters. While a generally higher pressure may be desirable, the pressure should be balanced to cause the water jets 58, 64 to pass through the brewing substance 36 while not puncturing or otherwise tearing the filter material 34. In other words, while the water flows through the pod 26 there are no additional structures which extend into or otherwise penetrate or pierce the pod. ;

It should be noted that the angle of the angled passages 56 is not limited to that as shown in the present disclosure, rather, it is envisioned that the angles will be adjusted to an angle which produces desirable flavor characteristics. Additionally, with reference to FIG. 2, a generally alternating pattern of first passages or inner angled tubes or passages 80 and second passages or outer angled tubes or passages 82 in combination with alternating vertical passages 54 and an enlarged central passage 52 is shown, other configurations may be used. For example, in one situation it may desirable to have opposing angled passages as opposed to offset angled passages. Further, it may be desirable to provide a variety of angles to the passages in a single spray head so that the brewing substance 36 is engaged by multiple spray paths at different levels throughout the thickness of the pod.

It is envisioned that the spray head 10 of the present disclosure will enhance the subjective as well as objective characteristics of the brewed beverages. For example, by increasing the interaction of the water with the brewing substance the uniformity of extraction produced from the pod 26 in this system 12 will be increased. The increase will be in contrast to other pod brewer spray heads which generally only direct the flow of liquid downwardly in a vertical direction through the smallest thickness dimension of the pod. It is envisioned that the spray head in combination with the system as disclosed will reduce the over extraction of some areas and under extraction of other areas by more uniformly distributing the water through the pod and sealing the pod earlier in the brewing process to increase the volume of water which flows through the pod and prevent and further reduce the volume of water which might otherwise bypass the brewing substance.

The spray head 10 as shown in the drawings and described herein may be formed of any suitable material including metal, plastic, resins, glass, composite materials, or any other suitable material which will perform in the brewing environment. In contrast to other pod brewing systems, the spray head 10 of the present disclosure has a body 11 having a thickness dimension 86 which is greater than the other pod brewing spray heads. The additional thickness of the spray head 10 body 11 provides suitable dimensions to facilitate angled orientation of the passages. It is envisioned that a thinner material dimension 86 may be used with the addition of nozzles or ports extending from the surface of the spray head to provide the added length dimension to achieve a desired passage angle and length.

As shown in FIG. 2, the spray head 10 includes the passages 54, 80, 82. As shown in FIG. 2, the spray head as illustrated is formed of a material which is at least partially transparent resulting in showing both an entry port 94 at the top side 48 and a corresponding exit port 96 at the bottom side 50 for each of the angled passages 80, 82. A transparent material is not a requirement of this disclosure but is provided by way of example and clarity of description and not limitation.

Also, as shown in FIG. 2, ribs 98 are provided radially extending through the spray head body 11 to help strengthen the structure. The strengthening tends to stiffen the part and help enhance the sealing characteristics of a seal associated with the spray head. It will be appreciated by one of skill in the art that a suitable material may eliminate the need for ribs altogether. Nevertheless, in the illustrated embodiment ribs were employed to help strengthen the structure while minimizing the thickness. Generally, the surface facing the pod, surface 50, is a generally smooth and continuous surface. It is envisioned that a variety of geometries may be used for the spray head 10, stiffening or reinforcing structures and any other structure associated with the spray head. In this regard, it is envisioned that all geometries associated with the general concept disclosed herein are included in the present disclosure.

In use, the system 12 is provided with the brewer assembly 20 including a housing 22 defining the chamber 24. Water is heated in the water delivery assembly 14 and controllably passed to the housing 22 through a conduit or tube 88 communicating with the chamber 24. Water is introduced into an upper portion 90 of the chamber and distributed by the spray head 10 through a plurality of passages 54, 56. As noted above the passages may be a combination of vertical passages 54 and angled passages 56 or all angled passages 56. Water 18 is directed from the passages 54, 56 into the pod 26 retained in the chamber 24. The water emitted from the passages is under pressure and is directed into the brewing substance 36 of the pod 26. The inwardly directed angle passages 56 cause the water to flow through a longer flow path 60 thereby engaging more water with more brewing substance more quickly. Early in the brew cycle or brewing process the increased attraction between the water and the brewing substance causes the pod to swell or otherwise expand and generally seal an external surface 68 of the pod 26 against an interior surface 70 of the chamber 24. The sealing of the pod against the chamber reduces the quantity of water which might otherwise bypass the pod. Brewed beverage is emitted from the underside of the pod and flows into a lower portion 40 of the chamber 24 and through outlet passage 44 into the cup 46.

Further details of the configuration and operation of the single-serving brewer 20 can be found in related provisional applications entitled "Apparatus, System and Method for Infusing a Pre-Packaged Pod filed Feb. 9, 2004 U.S. Provisional Application No. 60/543,370, "Apparatus System and Method for Retaining Beverage Brewing Substance" filed Feb. 6, 2004 U.S. Provisional Application No. 60/542,433, and "Pod Brewer Design" filed Feb. 10, 2004 U.S. Provisional Application No. 29/199,168. Additional information related to a spray head system and method for delivering water to the brewing assembly of the single-serving brewer 20 can be found in U.S. Provisional Application entitled "Water Delivery System, Method and Apparatus" filed Nov. 7, 2003, U.S. Provisional Application No. 60/518,411. Additional information related to beverage making apparatus which uses loose coffee and related devices and methods of use can be found in U.S. Provisional Application entitled "A Beverage Making Apparatus and Method Using Loose Beverage Substances" filed Apr. 2, 2004, U.S. Provisional Application No. 60/560,033. Information about a pod holder with a removable insert can be found in U.S. Provisional Application entitled "Pod Holder with Removable Insert" filed May 28, 2004, U.S. Provisional Application No. 60/575,235. Information about a beverage making apparatus which uses loose coffee and related devices and methods of use can be found in US Provisional Application entitled "A Beverage Making Apparatus and Method Using Loose Beverage Substance" filed Sep. 1, 2004, U.S. Provisional Application No. 60/606,233. Each of the above-referenced applications and the materials set forth therein is incorporated herein by reference in its entirety.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the following claims.

The invention claimed is:

1. A spray head in combination with a brewer for directing a controllable flow of pressurized water from the brewer to the spray head and into a brewing substance pod having a non-rigid covering material retained in a releasably sealable chamber of a housing of the brewer, the housing comprising an upper portion, a lower portion and the chamber, the spray head defining one portion of the chamber of the brewer and comprising:
a body defining a thickness dimension;
the body defining a top side and a bottom side facing an open portion of the chamber;
a water pressure expandable gasket being retained on one of the upper portion and the lower portion for sealing against the other of the upper portion and lower portion and surrounding the open portion between the upper portion and the lower portion for sealing the body against the pressurized water;
a plurality of spaced apart angled passages extending from the top side through the bottom side;
the angled passages being generally directed radially inwardly; and
wherein the top surface of the pod is contacted by radially inwardly flow of hot water.

2. The spray head in combination with a brewer of claim 1 further comprising a plurality of first and second passages extending generally radially inwardly relative to the spray head body, the first passages being spaced generally relatively inwardly of the second passages, the passages providing spray paths angled towards the brewing substance at different positions.

3. The spray head in combination with a brewer of claim 1 further comprising ribs generally radially provided on the spray head body.

4. The spray head in combination with a brewer of claim 3 further comprising the ribs providing a strengthening of the body.

5. The spray head in combination with a brewer of claim 1 wherein an entry port is defined in the top side of the spray head body and an exit port is defined in the bottom side of the spray head body, the entry port and exit port defining an angled passage therebetween generally radially inwardly directed towards a brewing substance retained in the brewer.

6. A method for brewing a beverage in a brewer using a brewing substance pod having a non-rigid covering material retained in a releasably sealable chamber of a housing of the brewer, the housing comprising an upper portion, a lower portion and the chamber, the releasably sealable chamber including a top side and a bottom side, the method including the steps of:
providing a water pressure expandable gasket retained on one of the upper portion and the lower portion for sealing against the other of the upper portion and the lower portion and surrounding the open portion between the upper portion and the lower portion for sealing the body against the pressurized water;
providing a controllable pressurized water source in the brewer;
providing a spray head having a body defining at least a portion of the chamber of the brewer;
providing a plurality of spaced apart passages through the spray head body generally defined at an angle;
providing at least some of the plurality of passages at a generally radially inwardly orientation;
positioning a brewing substance pod in a brewer;
dispensing brewing water through the spray head;
causing expansion of the expandable gasket upon dispensing of the water from the spray head for enhancing the sealing of the top portion and the bottom portion; and
directly water through the angled passages along a spray path generally angled through the brewing substance wherein the top surface of the pod is contacted by radially inwardly flow of hot water.

7. The method of brewing a beverage in a brewer using a brewing substance pod retained in a releasably sealable chamber of the brewer of claim 6 further comprising the step of directing the angled passages generally radially inward relative to the brewing substance.

8. The method of brewing a beverage in a brewer using a brewing substance pod retained in a releasably sealable chamber of the brewer of claim 6 further comprising the steps of:
providing inner angled passages and outer angled passages; and
the inner passages directing water along a spray path generally radially inwardly of the outer passages for delivering water to multiple areas of the brewing substance.

9. The method of brewing a beverage in a brewer using a brewing substance pod retained in a releasably sealable chamber of the brewer of as in claim 6 further comprising the steps of:
providing generally vertically aligned passages through the spray head body; and
delivering water through the generally vertically aligned spray head passages and the angled passages for delivering water to the brewing substance at different angles.

10. A system for brewing a beverage in a brewer using a brewing substance pod having a non-rigid covering material retained in a releasably sealable chamber of the brewer including a spray head, the system comprising:
a top side and a bottom side of the releasably sealable chamber, an open portion of the chamber being defined between the top side and the bottom side;
providing a controllable pressurized water source in the brewer;
providing a spray head having a body defining at least a portion of the top side of the chamber of the brewer;
providing a plurality of spaced apart passages extending through the body generally at an angle;
providing at least some of the plurality of passages at a generally radially inwardly orientation;
retaining the spray head in the brewer with the spray head defining one portion of the chamber of the brewer;
providing a water delivery assembly in the brewer communicating with the pressurized water source;
placing the spray head in operative communication with the water delivery assembly to receive pressurized water from the water delivery assembly; and delivering pressurized water through the angled passages of the spray head to direct the spray path of the water generally radially inwardly to increase the interaction with the brewing substance pod retained in the chamber wherein the top surface of the pod is contacted by radially inwardly flow of hot water; and a water pressure expandable gasket being retained on one of the top side and the bottom side for sealing against the other of the top side and bottom side and surrounding the open portion between the top side and the bottom side for sealing the body against the pressurized water delivered to the chamber.

11. The system for brewing a beverage in a brewer using a brewing substance pod retained in a releasably sealable chamber of the brewer including a spray head of claim 10 further comprising providing inner angled passages and outer angled passages through the spray head;

the inner angled passages being positioned through the spray head body generally radially inwardly of the outer angled passages.

12. The system for brewing a beverage in a brewer using a brewing substance pod retained in a releasably sealable chamber of the brewer including a spray head of claim 10 further comprising generally directing the spray path of water from the water delivery system through the spray head generally inwardly of a brewing substance to promote expansion of the brewing substance generally outwardly.

13. The system for brewing a beverage in a brewer using a brewing substance pod retained in a releasably sealable chamber of the brewer including a spray head of claim 12 further comprising providing a brewing chamber in the brewer;

a brewing substance being retainable in the brewing chamber;

the spray head communicating with the brewing chamber to delivery brewing water to the brewing chamber; and generally radially inwardly directing water flow through the passages for delivering water to an inner portion of the brewing substance retained in the brew chamber so as to promote expansion of the brewing substance outwardly radially in the brewing chamber to help promote controlled expansion and sealing of the brewing substance in the brewing chamber.

14. A pod brewing system including a controllable flow pressurized water delivery assembly, a releasably sealable brew chamber communicating with the water delivery assembly, the brew chamber being sized and dimensioned for receiving at least one brewing substance pod having a non-rigid covering material, a top side and a bottom side of the releasably sealable brew chamber, an open portion of the chamber being defined between the top side and the bottom side for completely retaining a pod within the open portion, a spray head disposed in relation to the brew chamber and defining at least a portion of the chamber for receiving water from the controllable flow pressurized water delivery assembly of the brewer, the spray head having a body defining a plurality of angled passage therethrough for directing water at an angle, at least some of the plurality of passages disposed generally radially inwardly, into a brewing substance pod disposed in the open portion of the brewing chamber, wherein the top surface of the pod is contacted by radially inwardly flow of hot water, and a water pressure expandable gasket being retained on one of the top side and the bottom side for sealing against the other of the top side and bottom side and surrounding the open portion between the top side and the bottom side for sealing the brew chamber against the pressurized water dispensed to the open portion from the spray head.

15. A method for producing a beverage in a brewer using a brewing substance pod having a non-rigid covering material retained in a releasably sealable chamber of the brewer including a spray head, a top side and a bottom side of the releasably sealable brew chamber, an open portion of the chamber being defined between the top side and the bottom side for completely retaining a pod within the open portion, the spray head having a body defining at least a portion of the chamber of the brewer and defining a plurality of spaced apart angled passages extending therethrough generally defined at an angle, providing a controllable pressurized water source in the brewer; delivering water from the controllable pressurized water source to the spray head, directing water through the spray head, emitting water from the spray head at an angle defined by the angled passages, providing at least some of the plurality of passages at a generally radially inwardly orientation; penetrating a brewing substance pod retained relative to the spray head, penetration of water through the brewing substance emitted from the spray head at least initially at an angle generally defined by an angle of the corresponding angled passage wherein the top surface of the pod is contacted by radially inwardly flow of hot water; and a water pressure expandable gasket being retained on one of the top side and the bottom side for sealing against the other of the top side and bottom side and surrounding the open portion between the top side and the bottom side for sealing the brew chamber against the pressurized water dispensed to the open portion from the spray head.

* * * * *